US007301998B2

(12) United States Patent
Asuri et al.

(10) Patent No.: US 7,301,998 B2
(45) Date of Patent: Nov. 27, 2007

(54) FILTER WITH SIGNAL TAPS TEMPORALLY SPACED AT FRACTIONAL SYMBOL INTERVALS

(75) Inventors: Bhushan Asuri, Oak Park, CA (US); Anush A. Krishnaswami, Los Angeles, CA (US); William J. Chimitt, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 10/742,119

(22) Filed: Dec. 19, 2003

(65) Prior Publication Data
US 2005/0135473 A1   Jun. 23, 2005

(51) Int. Cl.
*H03K 5/159* (2006.01)
(52) U.S. Cl. ............... 375/234; 375/229; 375/230
(58) Field of Classification Search ........... 375/139, 375/229–234; 708/300, 322, 323
See application file for complete search history.

(56) References Cited

U.S. PATENT DOCUMENTS

| | | | |
|---|---|---|---|
| 4,419,756 A | | 12/1983 | Cheng-Quispe et al. |
| 4,550,415 A | * | 10/1985 | Debus et al. ............... 375/234 |
| 5,594,576 A | * | 1/1997 | Sutherland et al. ........... 398/58 |
| 5,809,086 A | * | 9/1998 | Ariyavisitakul ............. 375/332 |
| 5,818,544 A | | 10/1998 | Han |
| 5,822,143 A | * | 10/1998 | Cloke et al. .................. 360/65 |
| 6,608,864 B1 | | 8/2003 | Strait |
| 6,907,064 B1 | * | 6/2005 | Tokunaga et al. ........... 375/232 |
| 2002/0122480 A1 | * | 9/2002 | Abnous et al. ............. 375/233 |
| 2002/0150155 A1 | | 10/2002 | Florentin et al. |
| 2003/0220781 A1 | * | 11/2003 | Salmonsen et al. ........... 703/25 |
| 2005/0134350 A1 | | 6/2005 | Huang et al. |
| 2005/0169168 A1 | * | 8/2005 | Aronson et al. ............. 370/222 |
| 2006/0104342 A1 | * | 5/2006 | Shanbhag et al. .......... 375/234 |

FOREIGN PATENT DOCUMENTS

| | | |
|---|---|---|
| EP | 0701350 A2 | 3/1996 |
| EP | 0756404 A2 | 1/1997 |
| WO | WO-9727695 A2 | 7/1997 |
| WO | WO-0108373 A2 | 2/2001 |

OTHER PUBLICATIONS

*Invitation to Pay Additional Fees and Partial International Search Report*, Dated May 2, 2005, PCT/US2004/041109, 6 Pages.

(Continued)

*Primary Examiner*—Chieh M. Fan
*Assistant Examiner*—Julia P Tu
(74) *Attorney, Agent, or Firm*—Grossman, Tucker, Perreault & Pfleger, PLLC (57) ABSTRACT

Described are methods and devices for processing a signal transmitting symbols which are temporally spaced on symbol intervals. The signal may be tapped at fractional symbol intervals to provide a plurality of signal taps at the fractional symbol intervals. Each of a plurality of coefficients may be applied to a corresponding one of the signal taps to generate an equalized signal. For at least one of the signal taps, the corresponding coefficient may be updated no more frequently than once per symbol interval.

23 Claims, 6 Drawing Sheets

OTHER PUBLICATIONS

*International Search Report and Written Opinion of the International Seaching*: Dated Jul. 6, 2005; PCT/US2004/041109; 21 pages.

Haar, S. , et al., "Equalizer-Based Symbol-Rate Timing Recovery for Digital Subscriber Line Systems", *Globecom'02-2002-IEEE Global Telecommunications Conf.*, vol. 1 of 3, IEEE 2002,(Nov. 17, 2002),312-316.

Karaoguz, J. , et al., "A Soft Decision-Directed Blind Equalization Algorithm Applied to Equalization of Mobile Communication Channels", *Proceedings of the International Conference on Communications, IEEE, US*, vol. 4 (Jun. 14, 1992), 1272-1276.

Raghunath, R. K., "Staggered Transpose Form Equalizer Using A RAM (RAM-EQ)", *Signals, Systems & Computers, 1999 Conf. Record of the Thitry-third Asilomar Conf*, vol. 1, IEEE 1999,(Oct. 24, 1999),115-119.

Office Action from related Taiwan application dated Aug. 24, 2007, 3 pgs.

\* cited by examiner

FILTER WITH SIGNAL TAPS TEMPORALLY SPACED AT FRACTIONAL SYMBOL INTERVALS

RELATED MATTERS

The subject matter disclosed herein relates to U.S. patent application Ser. Nos. 10/741,001, 10/741,044, 10/741,039 and 10/741,029 filed concurrently with the present application and incorporated herein by reference.

BACKGROUND

1. Field

The subject matter discloses herein relates to devices and methods of processing data received from a transmission medium. In particular, the subject matter disclosed herein relates to processing signals received from a communication channel in the presence of noise and distortion.

2. Information

To recover information from a signal received from noisy communication channel with distortion, receivers typically employ filtering and equalization techniques to enable reliable detection of the information. Decreases in the cost of digital circuitry have enabled the cost effective use of adaptive digital filtering and equalization techniques that can optimally "tune" a filter according to the specific characteristics of a noisy communication channel.

Figure 1:
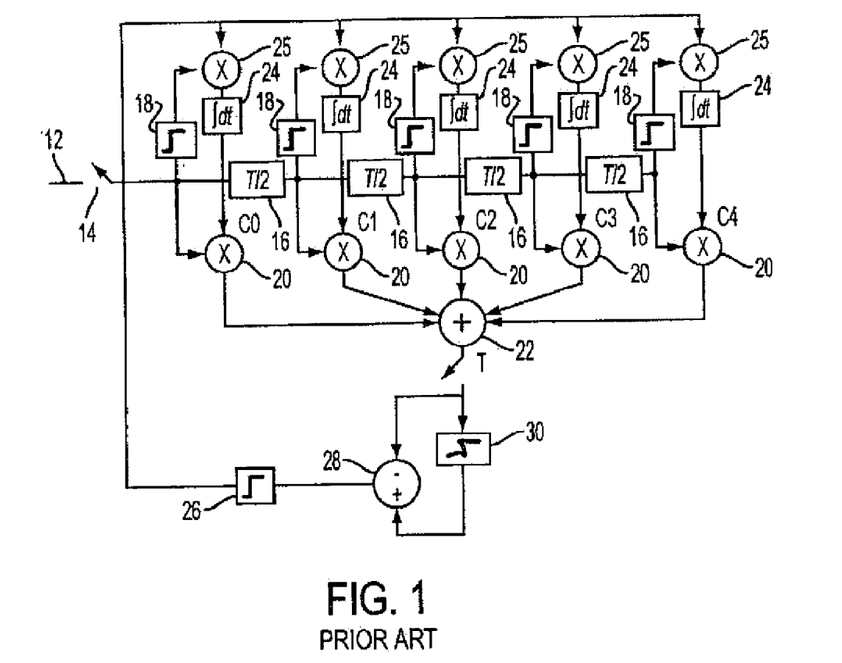
FIG. 1 shows a conventional digital filter employing a finite impulse response configuration.

FIG. 1 shows a conventional digital filter 10 employing a finite impulse response (FIR) configuration. An analog input signal 12 is received at an analog to digital converter (ADC) 14 to provide a digital signal at discrete sample intervals. The analog input signal 12 may be transmitting encoded symbols representing information in a noisy communication channel. The ADC 14 may sample the analog input signal 12 at discrete sample intervals corresponding with an intersymbol temporally spacing or fractions thereof. In the illustrated example, the ADC 14 samples the analog input signal 12 at half the temporal spacing between consecutive symbols (i.e., T/2 where "T" represents a symbol interval) in the analog input signal 12. On each discrete sample interval, the digital signal from the present discrete sample interval is provided to a multiplication circuit 20 to be scaled by coefficient $c_0$, and signal taps from previous discrete sample intervals (i.e., digital samples delayed by delay circuits 16) are provided to multiplication circuits 20 to be scaled by coefficients $c_1$ through $c_4$, respectively. The outputs of the three multiplication circuits are then additively combined at a summing circuit 22 as an equalized output signal.

The coefficients $c_0$ through $c_4$ are typically updated to approximate a least mean square error (LMS) filter for the particular FIR filter configuration. A limiting circuit 30 may provide a bi-level detection of symbols from the filtered output the summing circuit 22 and differencing circuit 28 provides a difference between the filtered output and the detected symbol as an "error." A limiting circuit 26 provides a sign of the error to each of multiplication circuit 25 for updating the coefficients $c_0$ through $c_4$. Each of the multiplication circuits 25 multiplies the sign of the error with the sign of a corresponding temporal version of the digital signal (as detected at a limiting circuit 18) and a sample and hold circuit 24 generates an updated coefficient.

Each of the coefficients $c_0$ through $c_4$ is typically updated on the discrete sample intervals. Accordingly, for a discrete sample intervals at fractions of a symbol interval, the $c_0$ through $c_4$ are typically updated on the fractions of the symbol interval. Such updates on the fractional symbol interval typically require costly charge pump circuitry at the sample and hold circuits 24 for updating the coefficients $c_0$ through $c_4$.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions or data. Such storage devices may comprise storage media such as, for example, optical, magnetic or semiconductor storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

A "receiver" as referred to herein relates to a system, apparatus or circuit to process a signal received from a transmission medium. For example, a receiver may comprise circuitry or logic to extract information encoded in a signal received from a transmission medium. However, this is merely an example of a receiver and embodiments of the present invention are not limited in this respect.

An "analog signal" as referred to herein relates to a signal having a value that may change continuously over a time interval. For example, an analog signal may be associated with one or more voltages where each voltage may change continuously over a time interval. An analog signal may be sampled at discrete time intervals to provide a "digital signal" where one or more discrete signal values are associated with each discrete time interval and, unlike an analog signal, do not change continuously between such discrete time intervals. However, this is merely an example of an analog signal as contrasted from a digital signal and embodiments of the present invention are not limited in these respects.

A "symbol" as referred to herein relates to a representation of information encoded in a signal transmitted in a transmission medium. For example, a symbol may represent a "one" or "zero" in a single information "bit" or multiple bits according to a symbol mapping defined for transmitting information in a communication channel. Accordingly, a transmitted symbol may be associated with a "symbol value" as defined by the symbol mapping. Upon receipt of a signal transmitting an encoded symbol, a receiver may extract an "estimated symbol value" to represent an estimate of the symbol value of the actual symbol transmitted by the signal in the communication channel. In the presence of noise in the communication channel, an estimated symbol value may deviate from the symbol value of the actual symbol transmitted by an "error." For a symbol value characterized as having a magnitude, an error associated with an estimated symbol value may be associated with a "sign" to represent whether the estimated symbol value exceeds or does not exceed the symbol value of the actual symbol transmitted. An "error signal" may be generated to provide information indicative of at least one aspect of a detected error. Such an error signal may include, for example, a sign of an error or a magnitude expressing a difference between a measured signal and an actual signal.

Symbols transmitted in a signal may be temporally spaced on "symbol" intervals such that during each distinct symbol interval the signal may transmit a corresponding symbol. An "equalized signal" as referred to herein relates to a signal that has been conditioned or processed. For example, a signal received from a communication channel in the presence of noise may be processed to enable or improve the detection of symbols being transmitted in the received signal. However, this is merely an example of an equalized signal and embodiments of the present invention are not limited in these respects.

A signal may be "tapped" to provide signal taps or delayed versions of a signal to be processed. A "multi-tap filter" as referred to herein relates to circuitry or logic to process a signal by individually processing the signal at distinct signal taps and combining the individually processed signal taps to provide an equalized signal. For example, a multi-tap filter may comprise one or more delay elements to generate one or more signal taps. An amplitude of each of the signal taps may then be scaled by a corresponding "coefficient." The scaled versions of the signal may then be combined to provide a filtered output signal. However, this is merely an example of a multi-tap filter and embodiments of the present invention are not limited in these respects.

A "correlation signal" as referred to herein relates to a result of a combination of two or more signals. A correlation signal may be the result of a multiplication of two or more signals, or a result of a logical operation on the two or more signals as inputs. In one particular example, a correlation signal may be the result of a combination of an error signal and a data signal. However, this is merely an example of a correlation signal and embodiments of the present invention are not limited in these respects.

"Inter-symbol timing information" as referred to herein relates to information that indicates the timing of a signal transmitting encoded symbols at set symbol intervals. Such inter-symbol timing information may be transmitted in a clock signal having a period that is synchronized with a period of the symbol intervals in the signal transmitting the encoded symbols. However, this is merely an example of inter-symbol timing information and embodiments of the present invention are not limited in this respect.

A "clock and data recovery circuit" as referred to herein relates to a circuit that is capable of detecting symbols encoded in a signal and timing information. For example, a clock and data recovery circuit may detect symbols in an equalized signal and inter-symbol timing information that is synchronized to symbol intervals in the signal. The clock and data recovery circuit may then generate a clock signal that is synchronized with the inter-symbol timing information. However, this is merely an example of a clock and data recovery circuit, and embodiments of the present invention are not limited in these respects.

Briefly, embodiments of the present invention relate to methods and devices for processing a signal transmitting symbols which are temporally spaced on symbol intervals. The signal may be tapped at fractional symbol intervals to provide a plurality of signal taps at the fractional symbol intervals. Each of a plurality of coefficients may be applied to a corresponding one of the signal taps to generate an equalized signal. For at least one of the signal taps, the corresponding coefficient may be updated no more than once per symbol interval. However, this is merely an example embodiment and other embodiments are not limited in these respects.

Figure 2:
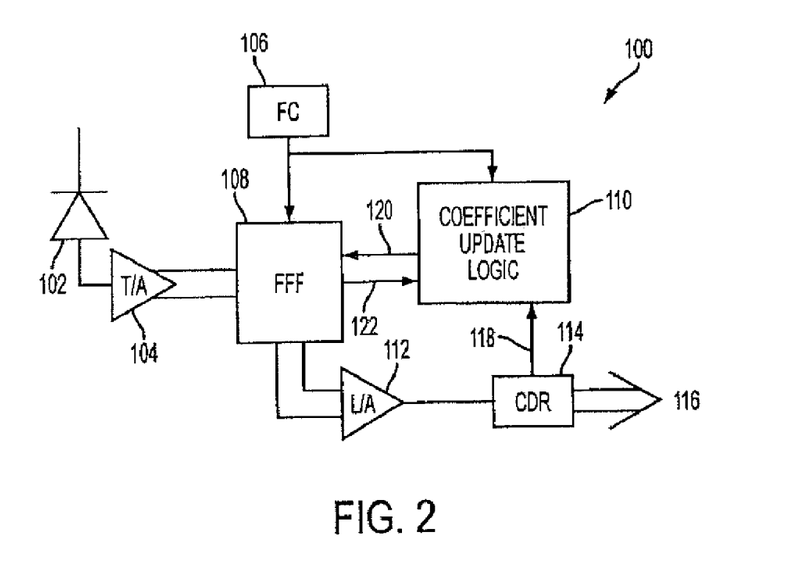
FIG. 2 shows a schematic diagram of a receiver according to an embodiment of the present invention.

FIG. 2 shows a schematic diagram of a receiver 100 according to an embodiment of the present invention. A transimpedance amplifier 104 may receive a current signal from a photodiode 102 in response to exposure to light energy (e.g., from a fiber optic cable). The transimpedance amplifier 104 may convert the current signal into an analog input signal expressed as a voltage signal representing the intensity of light energy received at the photodiode 102. A feed forward filter (FFF) 108 may process the analog input signal using a multi-tap filter (not shown) to provide an equalized signal to a limiting amplifier (LIA) 112. The LIA 112 may then map the equalized signal to specific voltages in a range of voltages and a clock and data recovery (CDR) circuit 114 may associate the mapped voltages to information symbol which are provided at output 116, and generate inter-symbol timing information 118.

According to an embodiment, coefficient update logic 110 may provide periodically updated coefficients to the multi-tap filter based upon estimated errors in the detection of symbols from the equalized signal and the inter-symbol timing information 118. In one embodiment, the FFF 108 may provide the equalized signal from an analog input signal without digitally sampling the analog input signal. In other embodiments, however, the FFF 108 may generate the equalized signal from a digital signal. A functional controller (FC) 106 may initialize coefficients in the FFF 108 and the coefficient update logic 110 at startup.

According to an embodiment, the FC 106 may control initial loop operation by disabling any dynamic operation of the coefficient update logic 110 and force the coefficients of FFF 108 to predetermined values. For example, the FC 106 may detect a dynamic condition (e.g., start up) and set the coefficients of the FFF 108 to the predetermined values. The FC 106 may then inhibit the coefficient update logic 110 from updating the coefficients from the predetermined values for a time period. In one embodiment, the FC 106 may enable the coefficient update logic 110 to update the coefficients in response to recovery of the inter-symbol timing information by the CDR circuit 114. Alternatively, the FC 106 may enable the coefficient update logic 110 to update the coefficients following a duration based upon an estimated time for CDR circuit 114 to recover the inter-symbol timing information.

While the receiver 100 is shown receiving an analog input signal from a photodiode and transimpedance amplifier, it should be understood that the architecture of receiver 100 may be adapted for processing an analog input signal from different transmission media. For example, other embodiments may be adapted for processing an analog input signal received as a differential signaling pair signal over unshielded twisted wire pair cabling or over a device to device interconnection formed in a printed circuit board. Other embodiments may be adapted to reading data from high density storage devices (e.g., optical storage media) to enable increased data storage density by equalizing distortion from the dense packing of bits on the high density devices. However, these are merely examples of how a receiver may be implemented for recovering information from a signal and embodiments of the present invention are not limited in these respects.

The receiver 100 may be included as part of an optical transceiver (not shown) to transmit or receive optical signals in an optical transmission medium such as fiber optic cabling. The optical transceiver may modulate a transmitted signal or demodulate a received signal 112 according to any optical data transmission format such as, for example, wave division multiplexing wavelength division multiplexing (WDM) or multi-amplitude signaling (MAS). For example, a transmitter portion of the optical transceiver may employ WDM for transmitting multiple "lanes" of data in the optical transmission medium.

The FFF 108 and LIA 112 may form a physical medium dependent (PMD) section of the receiver 100. Such a PMD section may also provide power from a laser driver circuit (not shown) to a laser device (not shown). The CDR circuit 114 may be included in a physical medium attachment section coupled to the PMD section. Such a PMA section may also include de-multiplexing circuitry (not shown) to recover data from a conditioned signal received from the PMD section, multiplexing circuitry (not shown) for transmitting data to the PMD section in data lanes, and a serializer/deserializer (Serdes) for serializing a parallel data signal from a layer 2 section (not shown) and providing a parallel data signal to the layer 2 section 108 based upon a serial data signal provided by the CDR circuit 114.

According to an embodiment, the layer 2 section may comprise a media access control (MAC) device coupled to the PMA section at a media independent interface (MII) as defined IEEE Std.802.3ae-2002, clause 46. In other embodiments, the layer 2 section may comprise forward error correction logic and a framer to transmit and receive data according to a version of the Synchronous Optical Network/Synchronous Digital Hierarchy (SONET/SDH) standard published by the International Telecommunications Union (ITU). However, these are merely examples of layer 2 devices that may provide a parallel data signal for transmission on an optical transmission medium, and embodiments of the present invention are not limited in these respects.

The layer 2 section may also be coupled to any of several input/output (I/O) systems (not shown) for communication with other devices on a processing platform. Such an I/O system may include, for example, a multiplexed data bus coupled to a processing system or a multi-port switch fabric. The layer 2 section may also be coupled to a multi-port switch fabric through a packet classification device. However, these are merely examples of an I/O system which may be coupled to a layer 2 device and embodiments of the present invention are not limited in these respects.

Figure 3:
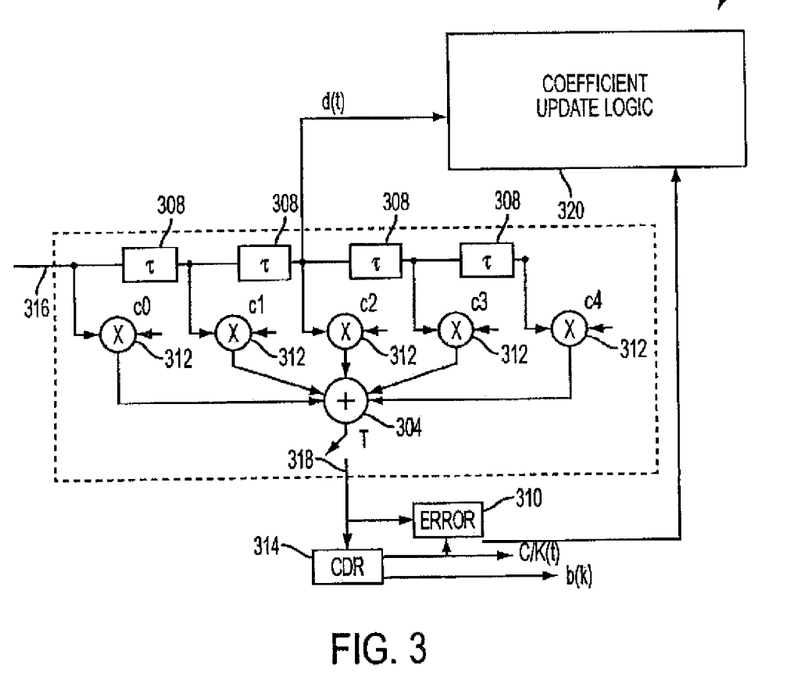
FIG. 3 shows a schematic diagram of a feed forward filter according to an embodiment of the receiver shown in FIG. 2.

FIG. 3 shows a schematic diagram of a feed forward filter 300 according to an embodiment of the receiver 200 shown in FIG. 3. Analog delay circuits 308 may generate delayed versions or signal taps of an analog input signal received on terminal 316. The analog delay circuits 308 may be formed as described in U.S. patent application Ser. Nos. 10/741,001 and 10/741,044 entitled "Analog Delay Circuit," incorporated herein by reference. The signal taps may be scaled by a coefficient at a corresponding multiplication circuit 312 and a summing circuit 304 may additively combine the outputs of the multiplication circuits 312 to generate an equalized output signal 318. The input signal may include symbols, such as bits, temporally spaced at symbol intervals (e.g., having a duration "T") such that one symbol may be transmitted per symbol interval. The signal taps may be generated at the output of delay elements 308 at fractions of a symbol interval where each delay element 308 delays input by a duration τ equaling a fraction of the symbol interval (e.g., half symbol intervals where τ=T/2). An error generation circuit 310 may provide an error signal associated with an equalized signal 318 at the output of summing circuit 304. The coefficients $c_0$ through $c_4$ may be updated once per symbol interval based upon a signal tap d(t) of the input signal and the error signal.

Figure 4:
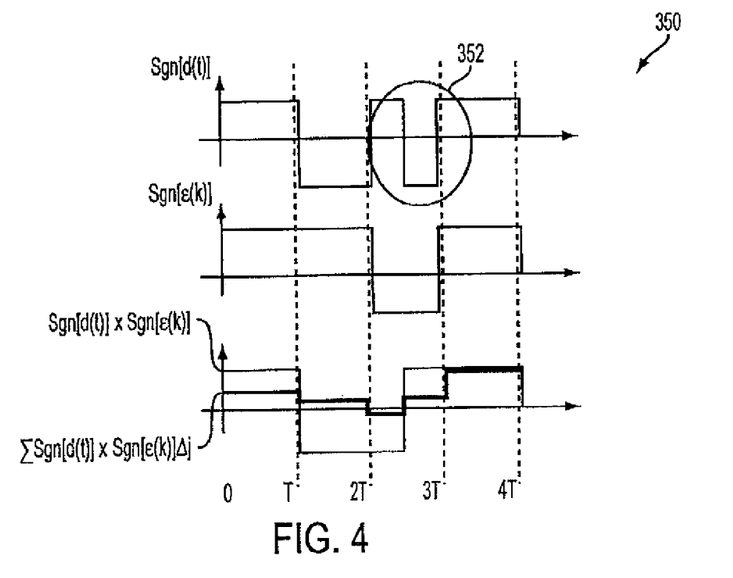
FIG. 4 shows a diagram illustrating the timing of signals used for updating coefficients in the feed forward filter shown in FIG. 3.

FIG. 4 shows a diagram illustrating the timing of signals used for updating coefficients in the feed forward filter shown in FIG. 3 according to an embodiment of the coefficient update logic 320. The third panel of FIG. 4 also shows the updated coefficient value. In the presently illustrated embodiment, an error signal from the error generation circuit 310 may comprise a sign of the estimated error associated with the equalized signal, sgn[ε(k)]. This error signal may change on boundaries of symbol intervals (shown in increments of T). However, the sign of the signal tap sgn[d(t)] may indicate a change in polarity on boundaries of a symbol interval and at fractions of the symbol interval as illustrated at portion 402 between boundaries 2T and 3T. While sgn[d(t)] is positive in a first fraction of the symbol interval between boundaries 2T and 3T, sgn[d(t)] turns negative in a second fraction of the symbol interval. According to an embodiment, coefficients for scaling a signal tap of the analog input signal may be updated on symbol intervals based upon the product of sgn[ϵ(k)] and the sign of the corresponding signal tap.

While the input signal may be tapped at fractions of the symbol interval, each coefficient may be conditionally updated once per symbol intervals as follows:

$$c_j(k+1) = c_j(k) + \Delta_j \times sgn[\epsilon(k)] \times sgn[a_j(k)],$$
$$\text{if } sgn[A_j(k)] = sgn[A_j(k+1/2)]$$

$$c_j(k+1) = c_j(k), \text{ if } sgn[A_j(k)] \neq sgn[A_j(k+1/2)]$$

where:

$c_j(k+1)$=the coefficient to scale the jth signal tap of the input signal in the future symbol interval k+1;

$c_j(k)$=the coefficient to scale the jth signal tap of the input signal in the present symbol interval k;

$sgn[\epsilon(k)]$=the sign of the estimated error of the equalized output signal in the present symbol interval k;

$sgn[a_j(k)]$=the sign of the signal tap of the input signal to be scaled by the coefficient $c_j(k)$ in the present period k;

$sgn[A_j(k)]$=the sign of the signal tap of the analog input signal, $a_j(k)$, to be scaled by the coefficient $c_j(k)$ in the present period k during a first fraction of the present symbol interval k;

$sgn[A_j(k+1/2)]$=the sign of the signal tap of the input signal, $a_j(k)$, to be scaled by the coefficient $c_j(k)$ in the present period k during a second fraction of the present symbol interval k; and $\Delta_j$=a predetermined constant.

According to an embodiment, the equalized output signal 318 may be received at a CDR circuit 314 to provide recovered symbol information b(k) and inter-symbol timing information in a clock signal Clk(t). The error generation circuit 310 may generate the sign of the estimated error of the equalized output signal sgn[ϵ(k)] in symbol interval k based upon the equalized output signal 318 and the inter-symbol timing information.

Figure 5:
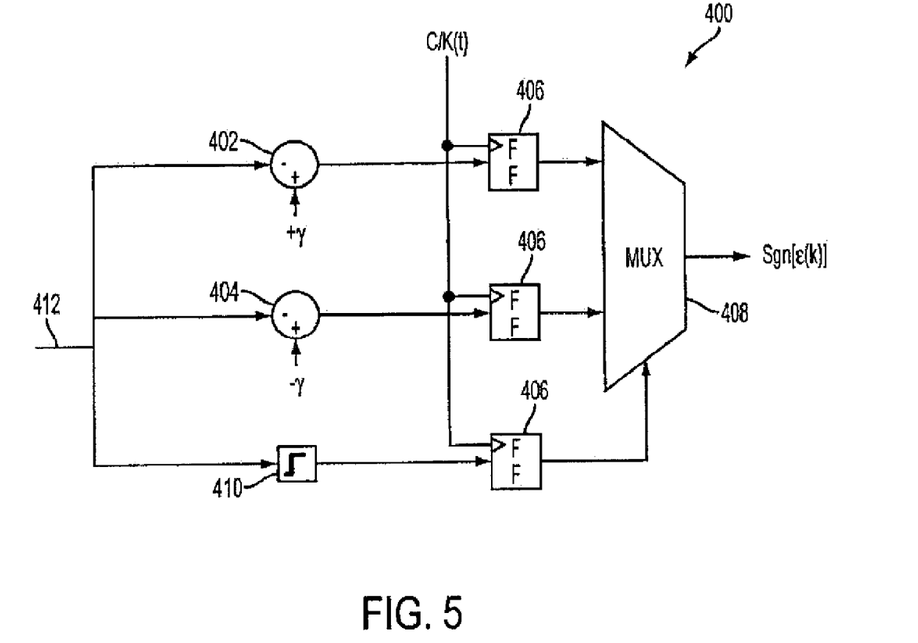
FIG. 5 shows a schematic diagram of a circuit to generate the sign of the estimated error of an equalized output signal according to an embodiment of the feed forward filter shown in FIG. 3.

FIG. 5 shows a schematic diagram of a circuit 400 to generate the sign of the estimated error of an equalized signal 412 (e.g., at the output of summing circuit 304) in the present period k, sgn[ϵ(k)], according to an embodiment of the error generation circuit 310 shown in FIG. 3. In the presently illustrated embodiment, one of two different symbols may be extracted from the analog input signal in a symbol interval, a positive symbol $^+\gamma$ (e.g., a positive voltage) and a negative symbol $^-\gamma$ (e.g., a negative voltage). However these are merely examples of symbols that may be extracted from an analog input signal during a symbol interval and embodiments of the present invention are not limited in this respect.

According to an embodiment, differencing circuits 402 and 404 may receive the equalized signal 412 to output a difference between the equalized 412 and each of the positive symbol $^+\gamma$ and the negative symbol $^-\gamma$. A limiting circuit 410 may also receive the equalized signal 412 to generate an estimate of a symbol value (e.g., between bi-level symbols +1 or −1) encoded in the analog input signal. The outputs of the differencing circuits 402 and 404, and the limiting circuit 410 are applied to inputs of a corresponding flip-flop circuit 406. Each of the flip-flop circuits 406 may also receive clock signal Clk(t) providing a pulse to mark a precise instance of when sgn[ϵ(k)] is to be determined (e.g., at a leading edge of Clk(t) pulses to mark an instance during a symbol interval for the detection of symbols). In response to a setting of the flip-flop circuits 406, a multiplexer (MUX) circuit 408 may receive from the differencing circuit 402 sgn[ϵ(k)] if the estimate of the symbol value is positive, from the differencing circuit 404 sgn[ϵ(k)] if the estimate of the symbol value is positive, and from the limiting circuit 410 an estimate of the symbol value. Accordingly, based upon the estimate of the symbol value (e.g., as being positive or negative) the MUX 408 may select sgn[ϵ(k)] as being positive or negative based upon the output of either differencing circuit 402 or differencing circuit 404.

Figure 6:
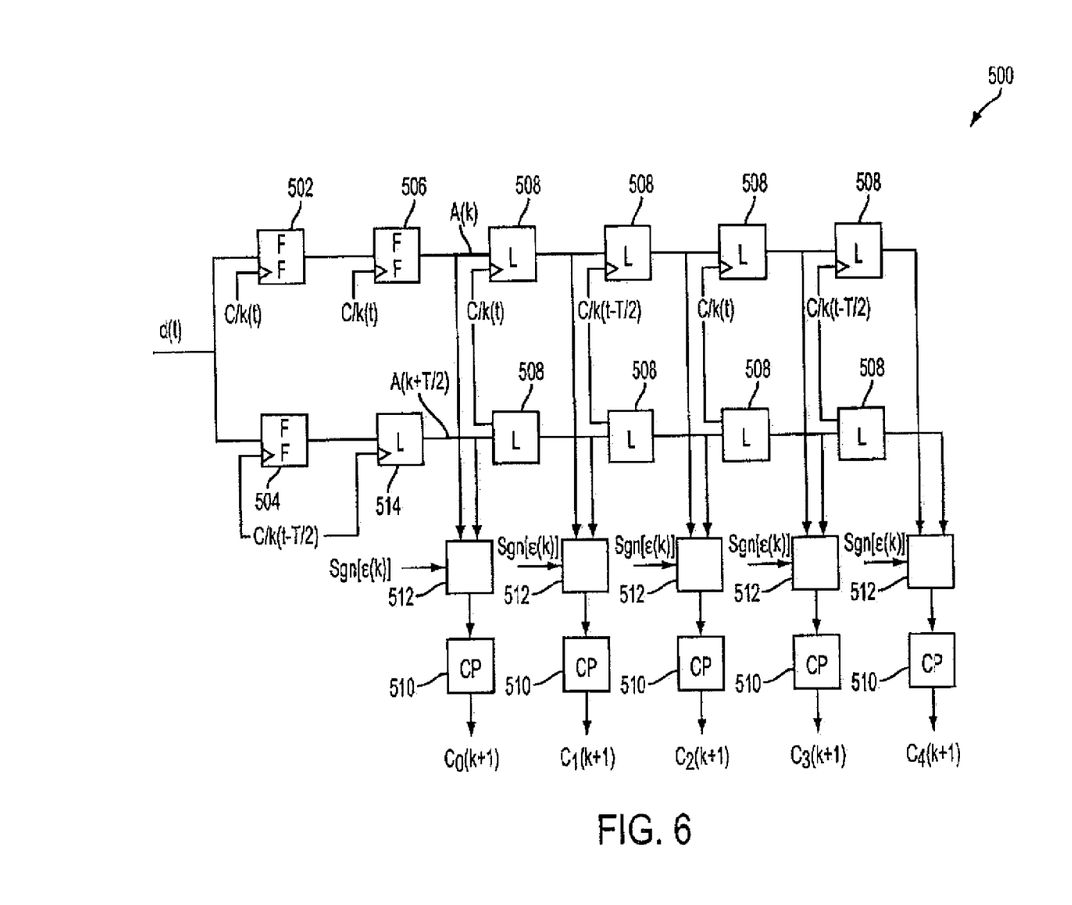
FIG. 6 shows a schematic diagram of coefficient update logic according to an embodiment of the feed forward filter shown in FIG. 3.

FIG. 6 shows a schematic diagram of a circuit 500 to update coefficients of a multi-tap filter according to an embodiment of the feed forward circuit shown in FIG. 3. Flip-flop circuits 502 and 504 receive a tap d(t) of the input signal and provide the sign of the tap d(t) samples in two fractions of a symbol interval T (A(k) and A(k+T/2)) in response to out of phase clock signals (Clk(t) and Clk(t−T/2)). Accordingly, A(k+T/2) may represent a sign of the tap d(t) in a second fraction of a symbol interval while A(k) may represent a sign of the tap d(t) in a first fraction of the symbol interval. In response to the leading edge of pulses of the clock signal Clk(t) on symbol intervals, the flip-flop circuit 502 may generate A(k) on the symbol intervals. Similarly, in response to the leading edge of pulses of the clock signal Clk(t−T/2) on symbol intervals, but out of phase from the leading edge of pulses of Clk(t) (e.g., by 180 degrees), the flip-flop circuit 504 may generate A(k+T/2).

According to an embodiment, a corresponding charge pump 510 may maintain a voltage to represent a coefficient (e.g., one of the coefficients $c_0$ through $c_4$) to be used in scaling a signal tap of the input signal. For each charge pump 510, coefficient update logic 512 may selectively update a corresponding coefficient $c_n$ for a future symbol interval k+1 based upon sgn[ϵ(k)] (e.g., as determined by error generation circuit 310) and the sign of the signal tap d(t) at different fractions of a symbol interval symbol interval A(k+nT/2) and A(k+(n+1)T/2). A flip-flop 506 and latch 514 may synchronize A(k) and A(k+T/2) to be provided to corresponding update logic 512 for updating the coefficient $c_0$ while delay elements 508 distribute the corresponding A(k+nT/2) and A(k+(n+1)T/2) on fractional symbol intervals T/2 to update logic 512 for updating the other coefficients $c_1$ through $c_4$. According to an embodiment, the delay elements 508 may be formed as single bit latches to be clocked at the symbol interval T with alternate delay elements being clocked out of phase by T/2. However, this is merely an example of how delay elements may be formed and embodiments of the present invention are not limited in this respect.

To update a coefficient $c_n$ from $c_n(k)$ to $c_n(k+1)$, according to an embodiment, corresponding update logic 512 may conditionally increase or decrease the voltage maintained in the corresponding charge pump 510 (for representing $c_n$) based upon whether A(k+nT/2) and A[k+(n+1)T/2] indicate a change in polarity during a symbol interval (i.e., transition from a first polarity in one fraction of the symbol interval to a second, different, polarity in a subsequent fraction of the symbol interval). As outlined in the following truth table, the update logic 512 may inhibit a change in the voltage maintained in a corresponding charge pump circuit 510 in the period from k to k+1 if A(k+nT/2)≠A[k+(n+1)T/2]

(indicating a change in polarity in one fraction of a symbol interval to a different polarity in a subsequent fraction of the symbol interval):

| $A(k + nT/2) =$ $A[k + (n + 1)T/2]$ | $Sgn[\epsilon(k)] =$ $A(k + nT/2)$ | Change $c_n(k)$ to $c_n(k + 1)$ |
|---|---|---|
| 0 | 0 | No change |
| 0 | 1 | No change |
| 1 | 0 | decrease charge pump voltage |
| 1 | 1 | increase charge pump voltage |

Figure 7:
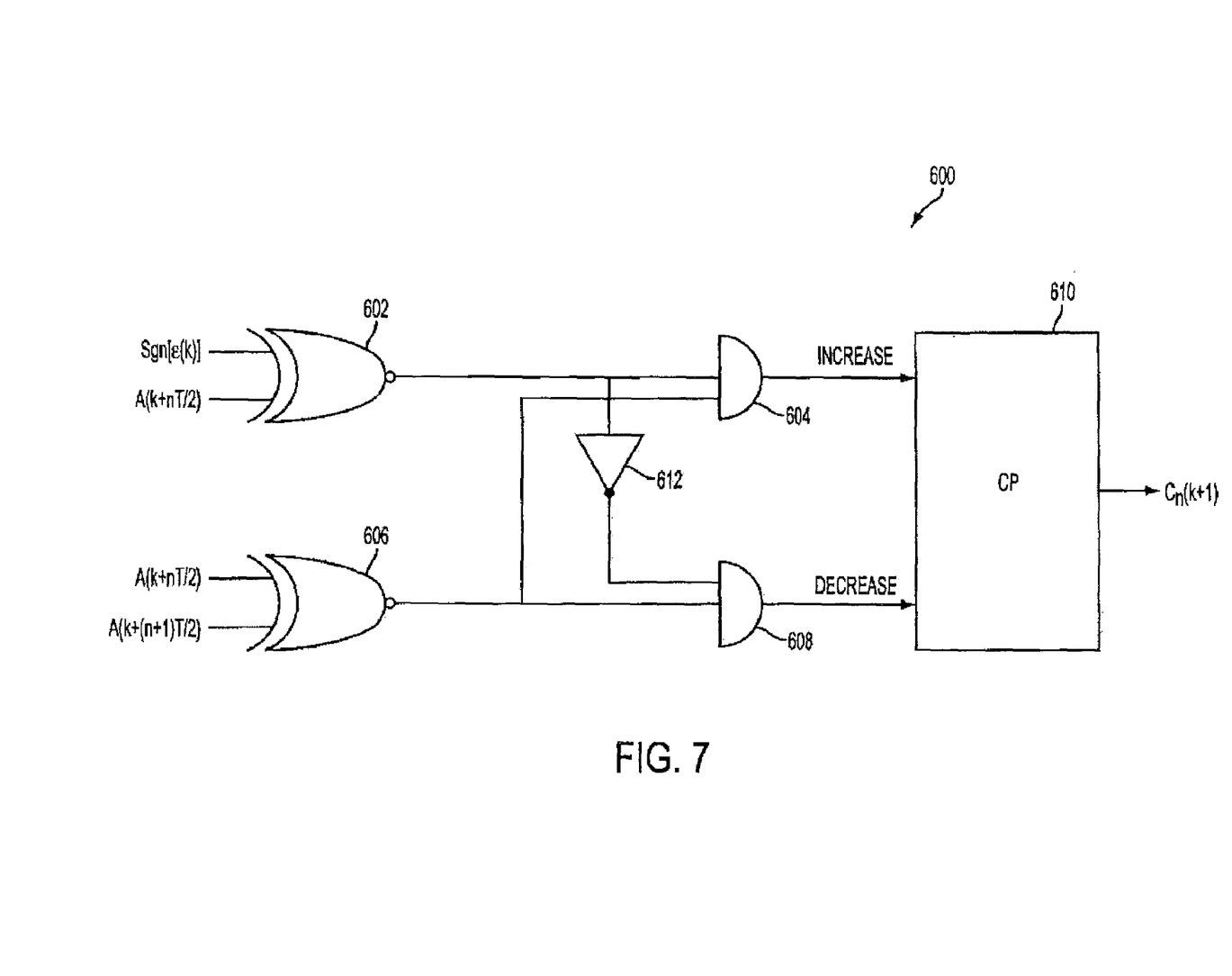
FIG. 7 shows a schematic diagram of logic for adjusting a voltage for a charge pump circuit representing a filter coefficient according to an embodiment of the coefficient update logic shown in FIG. 6.

FIG. 7 shows a schematic diagram of logic 600 for adjusting a voltage for a charge pump circuit 610 representing a filter coefficient according to an embodiment of the coefficient update logic 512 shown in FIG. 6. A charge pump circuit 610 may maintain a voltage to represent an updated coefficient $c_n(k+1)$ which may be increased (e.g., by an amount $\Delta_n$) in response to a high signal from AND gate 604 or decreased (e.g., by an amount $\Delta_n$) in response to a high signal from AND gate 608. A first NXOR gate 602 receives $sgn[\epsilon(k)]$ and $A(k-nT/2)$ at input terminals while a second NXOR gate 606 receives $A(k+nT/2)$ and $A[k+(n+1)T/2]$ at input terminals and outputs a correlation signal. Consistent with the truth table above, the charge pump voltage may only be increased or decreased when $A(k+nT/2)=A[k+(n+1)T/2]$. Otherwise, when $A(k+nT/2) \neq A[k+(n+1)T/2]$, the outputs of both AND gates 604 and 608 will remain low to result in neither an increase or decrease in the charge pump voltage such that $c_n(k+1)=c_n(k)$.

While signal taps may be generated at fractions of a symbol interval (e.g., at half symbol intervals T/2), the coefficients $c_0$ through $c_4$ may be updated no more frequently than on symbol intervals. The logic 600 is capable of detecting a symbol interval when the polarity of a signal tap corresponding to a coefficient $c_n$ changes during a transition from a first fraction of the symbol interval to a second fraction of a symbol interval (e.g., when $A(k+nT/2) \neq A[k+(n+1)T/2]$). Upon detection of such a symbol interval, the logic 600 may inhibit changing the voltage representing the coefficient maintained at charge pump 610. Accordingly, the charge pump 610 may be formed to respond to voltage updates on symbol intervals rather than fractions of symbol intervals, thus resulting in a less costly charge pump design.

Figure 8:
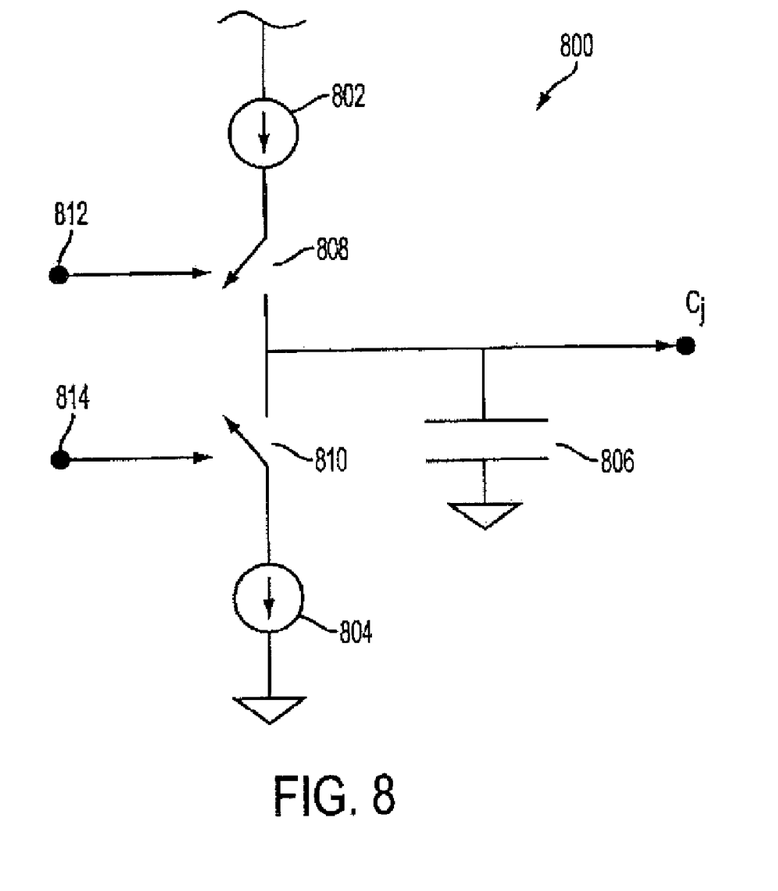
FIG. 8 shows a schematic diagram of a charge pump circuit according to an embodiment of the circuit shown in FIG. 7.

FIG. 8 shows a schematic diagram of a charge pump circuit 800 according to an embodiment of the charge pump circuit 610 shown in FIG. 7. According to an embodiment, switch 808 may couple a current source 802 to add charge to a capacitor 806 in response to a positive value from gate 604 (FIG. 7). Similarly, a switch 810 may couple a current source 804 to remove charge to a capacitor 806 in response to a positive value from gate 608 (FIG. 7). The resulting voltage of capacitor 806 may then represent the updated coefficient $c_j(k+1)$.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   receiving an analog input signal comprising symbols temporally spaced on symbol intervals;
   tapping the analog input signal at fractional symbol intervals to provide a plurality of signal taps at the fractional symbol intervals;
   applying each of a plurality of coefficients to a corresponding signal tap to generate an equalized signal; and
   for at least one of the taps, generating an updated coefficient no more frequently than once per symbol interval, wherein generating an updated coefficient no more frequently than once per symbol interval further comprises generating an error signal on each symbol interval which is representative of an estimated error associated with the equalized signal in the symbol interval and combining the error signal with a signal tap associated with the updated coefficient over the symbol interval to provide a correlation signal, said generating an updated coefficient no more frequently than once per symbol interval further comprising maintaining a charge pump voltage which is representative of the previous coefficient, updating the charge pump voltage on symbol intervals based, at least in part, upon the correlation signal to provide a charge pump voltage representative of the updated coefficient, and selectively inhibiting an update of the charge pump voltage on at least some of the symbol intervals in response to a change in polarity of the analog input signal during a symbol interval.

2. The method of claim 1, wherein the error signal is representative of a sign of the estimated error associated with the equalized signal.

3. The method of claim 1, the method further comprising:
   detecting a first symbol polarity in the analog input signal during a first fraction of a symbol interval;
   detecting a second symbol polarity in the analog input signal during a subsequent fraction of the symbol interval; and
   selectively inhibiting the update of the charge pump voltage in the symbol interval in response to the first symbol polarity being opposite the second symbol polarity.

4. The method of claim 3, the method further comprising:
   detecting the first symbol polarity in a first half of the symbol interval; and
   detecting the second symbol polarity in a second half of the symbol interval.

5. The method of claim 1, the method further comprising detecting symbols in the equalized analog signal on each of a sequence of symbol intervals to recover a symbol value in the symbol interval.

6. The method of claim 1, the method further comprising:
   setting the coefficients to predetermined values in response to detection of a dynamic condition; and
   inhibiting update of the coefficients from the predetermined values for a duration.

7. The method of claim 6, the method further comprising enabling update of the coefficients from the predetermined values in response to recovery of inter-symbol timing information in the equalized signal.

8. The method of claim 6, the method further comprising enabling update of the coefficients from the predetermined values following a duration based upon an estimated time to recover inter-symbol timing information from the equalized signal.

9. A receiver comprising:
a multi-tap filter to apply each of a plurality of coefficients to a corresponding signal tap of an analog input signal to generate an equalized signal, the analog input signal comprising a plurality of temporally spaced symbols encoded therein, the analog input signal being tapped at fractions of a symbol interval; and
a coefficient update circuit to update the coefficients, coefficients for at least one of the taps being updated no more frequently than once per symbol interval, said coefficient update circuit comprising:
an error generation circuit to generate an error signal on each symbol interval which is representative of an estimated error associated with the equalized signal in the symbol interval;
a circuit to combine the error signal with a signal tap associated with the updated coefficient over the symbol interval to provide a correlation signal;
a circuit to generate the updated coefficient based, at least in part, upon the correlation signal and a previous coefficient,
a charge pump circuit to maintain a charge pump voltage which is representative of the previous coefficient;
a circuit to update the charge pump voltage on symbol intervals based, at least in part, upon the correlation signal to provide a charge pump voltage representative of the updated coefficient; and
logic to selectively inhibit an update of the charge pump voltage on at least some of the symbol intervals in response to a change in polarity of the analog input signal during a symbol interval.

10. The receiver of claim 9, wherein the error signal is representative of a sign of the estimated error associated with the equalized signal.

11. The receiver of claim 9, wherein the logic to selectively inhibit the update of the charge pump voltage further comprises:
logic to detect a first symbol polarity in the analog input signal during a first fraction of a symbol interval;
logic to detect a second symbol polarity in the analog input signal during a subsequent fraction of the symbol interval; and
logic to selectively inhibit the update of the charge pump voltage in the symbol interval in response to the first symbol polarity being opposite the second symbol polarity.

12. The receiver of claim 11, wherein:
the logic to detect the first symbol polarity detects the first symbol polarity in a first half of the symbol interval; and
the logic to detect the second symbol polarity detects the second symbol polarity in a second half of the symbol interval.

13. The receiver of claim 9, wherein the receiver further comprises a detector to detect symbols in the equalized analog signal on each of a sequence of symbol intervals to generate a bit value in the symbol interval.

14. The receiver of claim 9, the receiver further comprising:
logic to set the coefficients to predetermined values in response to detection of a dynamic condition; and
logic to inhibit the coefficient update circuit from updating the coefficients from the predetermined values for a duration.

15. The receiver of claim 14, the receiver further comprising logic to enable the coefficient update circuit to update the coefficients from the predetermined values in response to recovery of inter-symbol timing information in the equalized signal.

16. The receiver of claim 14, the receiver further comprising logic to enable the coefficient update circuit to update the coefficients from the predetermined values following a duration based upon an estimated time to recover inter-symbol timing information from the equalized signal.

17. A system comprising:
a receiver adapted to process an analog input signal from a transmission medium, the receiver comprising:
a multi-tap filter to apply each of a plurality of coefficients to a corresponding signal tap of the analog input signal to generate an equalized signal, the analog input signal comprising a plurality of temporally spaced symbols encoded therein, the analog input signal being tapped at fractions of a symbol interval;
a coefficient update circuit to update the coefficients, coefficients for at least one of the taps being updated no more frequently than once per symbol interval, said coefficient update circuit comprising:
an error generation circuit to generate an error signal on each symbol interval which is representative of an estimated error associated with the equalized signal in the symbol interval;
a circuit to combine the error signal with a signal tap associated with the updated coefficient over the symbol interval to provide a correlation signal;
a circuit to generate the updated coefficient based, at least in part, upon the correlation signal and a previous coefficient,
a charge pump circuit to maintain a charge pump voltage which is representative of the previous coefficient;
a circuit to update the charge pump voltage on symbol intervals based, at least in part, upon the correlation signal to provide a charge pump voltage representative of the updated coefficient; and
logic to selectively inhibit an update of the charge pump voltage on at least some of the symbol intervals in response to a change in polarity of the analog input signal during a symbol interval;
a data recovery circuit to provide a serial data signal in response to the equalized signal; and
a deserializer to provide a parallel data signal in response to the serial data signal.

18. The system of claim 17, wherein the system further comprises:
a photodiode coupled to an optical transmission medium; and
a transimpedance amplifier to generate the analog input signal in response to a current from the photodiode.

19. The system of claim 17, the system further comprising a SONET framer to receive the parallel data signal.

20. The system of claim 19, wherein the system further comprises a switch fabric coupled to the SONET framer.

21. The system of claim 17, the system further comprising an Ethernet MAC to receive the parallel data signal at a media independent interface.

22. The system of claim 21, wherein the system further comprises a multiplexed data bus coupled to the Ethernet MAC.

23. The system of claim 21, wherein the system further comprises a switch fabric coupled to the Ethernet MAC.

* * * * *

UNITED STATES PATENT AND TRADEMARK OFFICE
CERTIFICATE OF CORRECTION

| | | |
|---|---|---|
| PATENT NO. | : 7,301,998 B2 | Page 1 of 1 |
| APPLICATION NO. | : 10/742119 | |
| DATED | : November 27, 2007 | |
| INVENTOR(S) | : Asuri et al. | |

It is certified that error appears in the above-identified patent and that said Letters Patent is hereby corrected as shown below:

On the title page, in field (75), in "Inventors", in column 1, line 2, delete "Los Angeles," and insert -- San Diego, --, therefor.

Signed and Sealed this

Eighth Day of July, 2008

JON W. DUDAS
*Director of the United States Patent and Trademark Office*